US012699294B2

(12) United States Patent
Zhang et al.

(10) Patent No.: US 12,699,294 B2
(45) Date of Patent: Aug. 4, 2026

(54) BACKLIGHT MODULES WITH OPTICAL FILMS HAVING A LUG PROTRUDING INTO A GROOVE OF A BACKBOARD

(71) Applicant: Wuhan China Star Optoelectronics Technology Co., Ltd., Wuhan (CN)

(72) Inventors: Shoudong Zhang, Wuhan (CN); Zheng Zhou, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/264,422

(22) PCT Filed: Jun. 2, 2023

(86) PCT No.: PCT/CN2023/098136
§ 371 (c)(1),
(2) Date: Aug. 6, 2023

(87) PCT Pub. No.: WO2024/239376
PCT Pub. Date: Nov. 28, 2024

(65) Prior Publication Data
US 2026/0072309 A1     Mar. 12, 2026

(30) Foreign Application Priority Data
May 25, 2023     (CN) .......................... 202310622454.1

(51) Int. Cl.
*G02F 1/13357* (2006.01)
*G02F 1/1335* (2006.01)
(52) U.S. Cl.
CPC .. *G02F 1/133608* (2013.01); *G02F 1/133512* (2013.01); *G02F 1/133607* (2021.01)

(58) Field of Classification Search
CPC ......... G02F 1/133607; G02F 1/133608; G02F 1/133512
(Continued)

(56) References Cited

U.S. PATENT DOCUMENTS 12,271,020 B2 * 4/2025 Wang .................... G02B 6/0055
2005/0259444 A1 * 11/2005 Choi .................... G02B 6/0088
362/633

(Continued)

FOREIGN PATENT DOCUMENTS

CN       102155691 A       8/2011
CN       202870439 U       4/2013
(Continued)

OTHER PUBLICATIONS

Chinese Office Action issued in corresponding Chinese Patent Application No. 202310622454.1 dated Jan. 14, 2025, pp. 1-10.
(Continued)

*Primary Examiner* — Robert J May
(74) *Attorney, Agent, or Firm* — Nathan & Associates Patent Agents Ltd.; Menachem Nathan

(57)                    ABSTRACT
Backlight module and display modules are provided in the present disclosure. The backlight module includes a backboard, a light guide plate, and an optical film group. The backboard includes a bottom plate and lateral plates connected with the bottom plate. At least one groove is provided on inner walls of the lateral plates. The light guide plate is disposed on the bottom plate. The optical film group includes a film body and at least one first lug. The first lug extends from a lateral side of the film body towards the backboard and corresponds to the groove one by one. The film body is disposed on the light guide plate. The first lug correspondingly protrudes into the groove.

20 Claims, 6 Drawing Sheets

(58) Field of Classification Search
USPC ........................................................ 362/97.1
See application file for complete search history.

(56) References Cited

U.S. PATENT DOCUMENTS

| | | | | |
|---|---|---|---|---|
| 2009/0303413 A1* | 12/2009 | Ohta | ................. | G02F 1/133606 |
| | | | | 362/257 |
| 2010/0238142 A1 | 9/2010 | Chuman et al. | | |
| 2016/0103649 A1 | 4/2016 | Yoshitani et al. | | |
| 2018/0113252 A1* | 4/2018 | Lee | .......................... | G02B 6/00 |
| 2021/0149106 A1 | 5/2021 | Liu | | |

FOREIGN PATENT DOCUMENTS

| | | | |
|---|---|---|---|
| CN | 104714335 | A | 6/2015 |
| CN | 204806113 | U | 11/2015 |
| CN | 105223730 | A | 1/2016 |
| CN | 106796769 | A | 5/2017 |
| CN | 207301563 | U | 5/2018 |
| CN | 108279533 | A | 7/2018 |
| CN | 208013627 | U | 10/2018 |
| CN | 208795969 | U | 4/2019 |
| CN | 114530097 | A | 5/2022 |
| CN | 114967227 | A | 8/2022 |
| CN | 115176197 | A | 10/2022 |
| KR | 20070057497 | A | 6/2007 |
| WO | 2021218580 | A1 | 11/2021 |

OTHER PUBLICATIONS

Chinese Office Action issued in corresponding Chinese Patent Application No. 202310622454.1 dated Mar. 26, 2025, pp. 1-6.
International Search Report in International application No. PCT/CN2023/098136,mailed on Jan. 3, 2024.
Written Opinion of the International Search Authority in International application No. PCT/CN2023/098136,mailed on Jan. 3, 2024.

* cited by examiner

BACKLIGHT MODULES WITH OPTICAL FILMS HAVING A LUG PROTRUDING INTO A GROOVE OF A BACKBOARD

CROSS-REFERENCE TO RELATED APPLICATION

This application is a national stage of International Application No. PCT/CN2023/098136, filed on Jun. 2, 2023, which claims priority to Chinese Patent Application No. 202310622454.1, filed on May 25, 2023. The aforementioned applications are herein incorporated by references in their entireties.

TECHNICAL FIELD

The present disclosure relates to the field of display technologies, and in particular, to backlight modules and display modules.

BACKGROUND

A backlight module is generally composed of a backboard, a light board, a light guide plate, an optical film group, a middle frame, and an auxiliary tape. The middle frame is configured to support the display panel, so as to prevent a large displacement of the optical film group in a vertical direction, which may result in problems of tripping and light leakage at the edge of the backlight. However, a main material selected for the middle frame is an injection molded plastic or a metal of sheet metal stamping. With the increase of a size of the backlight module, a wall thickness of the middle frame is thin, so it is difficult to process and assemble, which increases the costs and assembly process of the backlight module.

SUMMARY OF THE INVENTION

Backlight modules and display modules are provided according to embodiments of the present disclosure to solve a technical problem that when a middle frame is used in an existing backlight module to support a display panel, a wall thickness of the middle frame is thin, so it is difficult to process and assemble, which increases the costs and assembly process of the backlight module.

In order to solve the above problems, technical solutions provided by the present disclosure are as following.

The present disclosure provides a backlight module, including:

a backboard, including a bottom plate and lateral plates connected with the bottom plate, herein, the lateral plates each extends along a light emitting direction of the backlight module to define a chamber together with the bottom plate, and at least one groove is provided on inner walls of the lateral plates;

a light guide plate, disposed on the bottom plate; and an optical film group, including a film body and at least one first lug, herein, the film body is located in the chamber and disposed on the light guide plate, and the first lug extends from a lateral side of the film body towards the backboard and corresponds to the groove one by one; and herein, the first lug correspondingly protrudes into the groove.

According to the backlight module of the present disclosure, there is a first gap between an outer wall of the first lug and an inner wall of the groove correspondingly arranged.

According to the backlight module of the present disclosure, a light shielding layer is disposed on a side of the optical film group away from the bottom plate, and an orthographic projection of the light shielding layer on the bottom plate at least covers an orthographic projection of edges of the film body on the bottom plate.

According to the backlight module of the present disclosure, the light shielding layer covers a side of the first lug away from the bottom plate.

According to the backlight module of the present disclosure, there is a second gap between the light guide plate and the lateral plate, and the second gap is located on a side of the first lug adjacent to the bottom plate.

According to the backlight module of the present disclosure, a distance between a surface of the light guide plate away from the bottom plate and the bottom plate is greater than a distance between a surface of the groove close to the bottom plate and the bottom plate.

According to the backlight module of the present disclosure, the backlight module further includes at least one fixing block located in the second gap and abutting against the light guide plate and the lateral plate.

According to the backlight module of the present disclosure, a hardness of the fixing block is less than a hardness of the lateral plate and is less than a hardness of the light guide plate.

According to the backlight module of the present disclosure, the light guide plate includes a light guide body and at least one second lug connected with the light guide body; the film body is located on the light guide body; and the first lug is located on the second lug, and the second lug correspondingly protrudes into the groove.

According to the backlight module of the present disclosure, a surface of the groove close to the bottom plate is flush with a surface of the bottom plate close to the second lug.

According to the backlight module of the present disclosure, a buffer layer is provided between an outer wall of the first lug and an inner wall of the groove correspondingly arranged.

According to the backlight module of the present disclosure, the inner walls of the lateral plates are recessed toward a side away from the optical film group to define the groove; or the inner walls and outer walls of the lateral plates are both recessed toward a side away from the optical film group to define the groove.

The present disclosure provides a display module, including a backlight module;

a display panel, disposed on a light emitting side of the backlight module; and cover plate, located on a side of the display panel away from the backlight module and fixedly connected to the display panel;

herein the cover plate is fixedly connected to end surface of the lateral plates away from the bottom plate; and herein the backlight module includes:

a backboard, including a bottom plate and lateral plates connected with the bottom plate, herein, the lateral plates each extends along a light emitting direction of the backlight module to define a chamber together with the bottom plate, and at least one groove is provided on inner walls of the lateral plates a light guide plate, disposed on the bottom plate; and an optical film group, including a film body and at least one first lug, herein, the film body is located in the chamber and disposed on the light guide plate, and the first lug extends from a lateral side of the film body towards the backboard and corresponds to the groove one by one;

herein, the first lug correspondingly protrudes into the groove.

According to the display module of the present disclosure, there is a first gap between an outer wall of the first lug and an inner wall of the groove correspondingly arranged.

According to the display module of the present disclosure, a light shielding layer is disposed on a side of the optical film group away from the bottom plate, and an orthographic projection of the light shielding layer on the bottom plate at least covers an orthographic projection of edges of the film body on the bottom plate.

According to the display module of the present disclosure, the light shielding layer covers a side of the first lug away from the bottom plate.

According to the display panel of the present disclosure, there is a second gap between the light guide plate and the lateral plate, and the second gap is located on a side of the first lug adjacent to the bottom plate.

According to the display module of the present disclosure, a distance between a surface of the light guide plate away from the bottom plate and the bottom plate is greater than a distance between a surface of the groove close to the bottom plate and the bottom plate.

According to the display module of the present disclosure, the backlight module further includes at least one fixing block, and the fixing block is located in the second gap and abuts against the light guide plate and the lateral plate.

According to the display module of the present disclosure, the light guide plate includes a light guide body and at least one second lug connected with the light guide body, the film body is located on the light guide body, the first lug is located on the second lug, and the second lug correspondingly protrudes into the groove.

Beneficial Effects

The beneficial effects of the present disclosure are: in the backlight modules and the display modules provided by the present disclosure, at least one groove is provided on the inner walls of the lateral plates of the backboard, lateral walls of the film body extend toward the backboard to form at least one first lug, and the first lug correspondingly protrudes into the groove. The first lug is matched with the groove to support the display panel, which replaces the middle frame configured to support the display panel in the related art, so the middle frame may be eliminated, which may reduce the deformation of the module, is beneficial to simplify the assembly process to reduce the difficulty and costs of assembly. In addition, the groove can function as a limit to prevent the optical film group from tripping due to a large displacement in the vertical direction.

DESCRIPTION OF DRAWINGS

In order to more clearly illustrate the technical solutions in the present disclosure, the following will be a brief introduction to the drawings required in the description of the embodiments. It is obvious that the drawings described below are only some embodiments of the present disclosure. For those skilled in the art, without creative labor, other drawings may be obtained according to these drawings.

Figure 1:
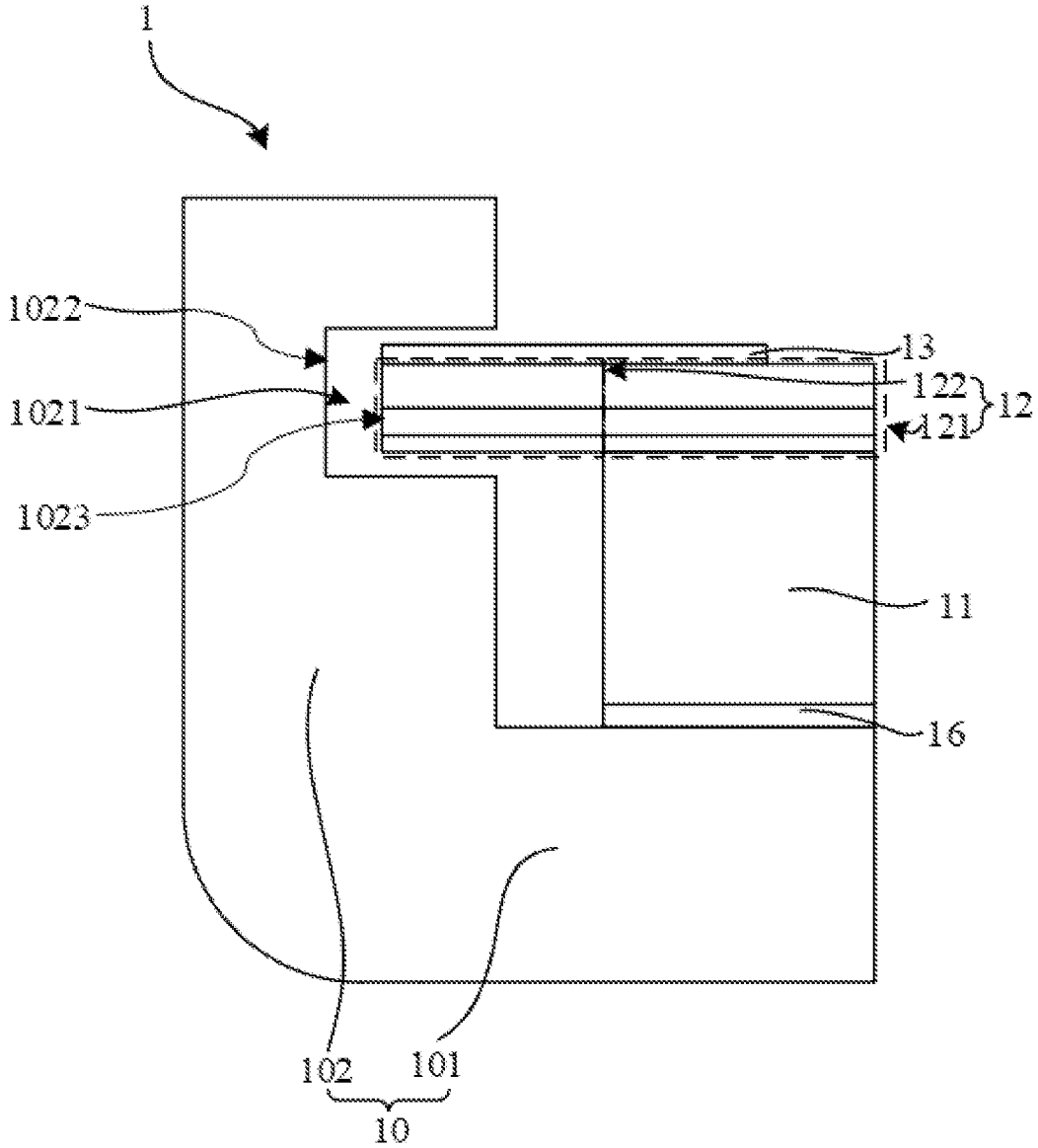
FIG. 1 is a first cross-sectional schematic view of a backlight module according to an embodiment of the present disclosure.

REFERENCE NUMERALS 1, backlight module; 10, backboard; 101, bottom plate; 102, lateral plate; 1021, groove; 1022, inner wall; 1023, outer wall; 11, light guide plate; 111, light guide body; 112, second lug; 12, optical film group; 121, film body; 122, first lug; 13, light shielding layer; 14, fixing block; 15, buffer layer; 16, reflective film; 2, display panel; 3, cover plate; 4, first adhesive layer; 5, second adhesive layer.

EMBODIMENTS OF THE INVENTION

Technical solutions in the embodiments of the present disclosure will be clearly and completely described below with reference to the accompanying drawings. Obviously, the described embodiments are only some of the embodiments of the present disclosure, not all of them. Based on the embodiments in the present disclosure, all other embodiments obtained by those skilled in the art without making creative efforts belong to the scope of protection of this application. In addition, it should be understood that the specific implementations described here are only used to illustrate and explain the present disclosure, and are not intended to limit the present disclosure. In the present disclosure, unless stated to the contrary, the orientation terms such as "up" and "down" generally refer to up and down in an actual use or working state of the devices, and the terms "inside" and "outside" refer to an outline of an installation.

When a middle frame is used in an existing backlight module and display module to support a display panel, a wall thickness of the middle frame is thin, so it is difficult to process and assemble, which increases the costs and assembly process of the backlight module. In view of the technical problem, backlight modules and display modules are provided in the present disclosure. The backlight modules and the display modules provided by the present disclosure will be described in detail below with reference to specific embodiments and drawings.

Figure 2:
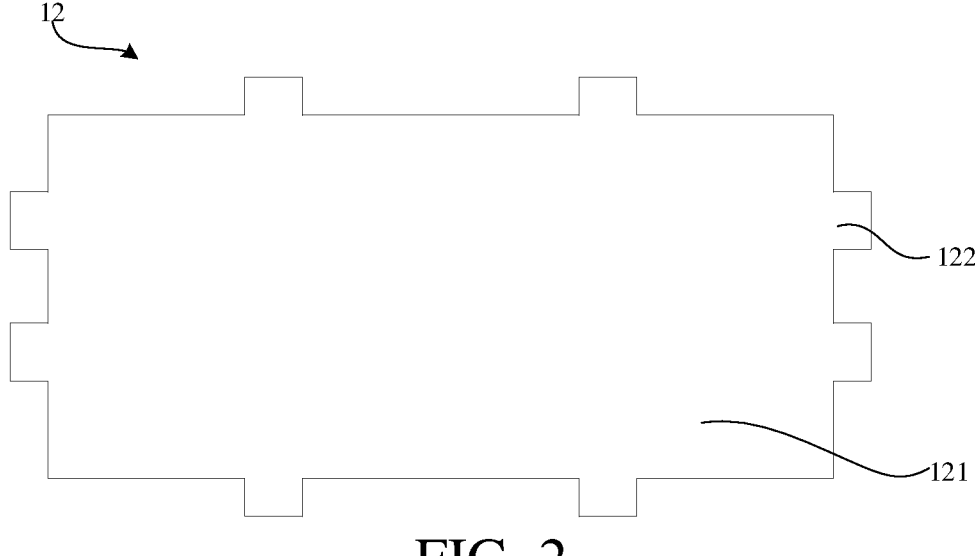
FIG. 2 is a schematic plan view of an optical film group of the backlight module in FIG. 1.

Referring to FIG. 1 and FIG. 2, FIG. 1 is a first cross-sectional schematic view of a backlight module according to an embodiment of the present disclosure, and FIG. 2 is a schematic plan view of an optical film group of the backlight module in FIG. 1. A backlight module 1 is provided in the embodiment of the present disclosure. The backlight module 1 includes a backboard 10, a light guide plate 11, and an optical film group 12. The backlight module may be a vehicle-mounted backlight module.

The backboard 10 includes a bottom plate 101 and lateral plates 102 connected with the bottom plate 101. The lateral plates 102 each extends toward a light emitting direction of the backlight module 1 to define a chamber together with the bottom plate 101. One or more grooves 1021 is provided on inner walls 1022 of the lateral plates 102. The light guide plate 11 is disposed on and fixedly connected with the bottom plate 101.

The optical film group 12 includes a film body 121 and one or more first lugs 122. The film body 121 is located in the chamber. The first lug 122 extends from a lateral wall of the film body 121 towards a lateral side of the backboard 10. The first lugs 122 correspond to the grooves 1021 on by one. The film body 121 is disposed on the light guide plate 11. The first lug 122 protrudes into the groove 1021.

It can be understood that, in the embodiments of the present disclosure, the first lugs 122 are matched with the grooves 1021 to support the display panel, which replaces a middle frame configured to support the display panel in the related art, so the middle frame may be eliminated, which may reduce the deformation of the module, is beneficial to simplify the assembly process to reduce the difficulty and costs of assembly. In addition, the groove 1021 can limit a position of the first lug 122. An inner wall of the groove 1021 located on a side of the first lug 122 away from the bottom plate 101 blocks shaking of the first lug 122. That is, the groove 1021 restricts a displacement of the optical film group 12 in a vertical direction, so as to prevent the optical film group 12 from tripping due to a large displacement in the vertical direction during a vibration experiment, thereby avoiding friction with the display panel above it.

Generally, the bottom plate 101 has a rectangular shape as a whole. The lateral plates 102 are distributed along an outline of outer edges of the bottom plate 101. A number of the lateral plates 102 is four, and the lateral plates 102 are disposed on four lateral sides of the bottom panel 101. Optionally, the bottom plate 101 is a die-casting part, which is stamped and formed by a metal material, and the lateral plates 102 are bent and deformed by the bottom plate 101.

Specifically, in order to improve a fixing strength of the optical film group 12 and further limit the displacement of the optical film group 12 in a certain direction, in the embodiments of the present disclosure, a number of the grooves 1021 may be multiple, and each of the lateral plates 102 is provided with the groove 1021. Preferably, a number of the grooves 1021 on each of the lateral plates 102 is the same. Each of the lateral plate 102 is provided with at least two grooves 1021 evenly distributed. Exemplarily, two grooves 1021 are disposed on each of the lateral plates 102, and the grooves 1021 on two opposite lateral plates 102 are disposed facing each other.

In other embodiments, the number of the groove 1021 may also be one. The groove 1021 is located on the four lateral plates 102 to form a closed structure around it, that is to say, the groove 1021 may be arranged in a circle.

Correspondingly, the optical film group 12 has a rectangular shape as a whole. A number of the first lugs 122 may be multiple, and each lateral side of the optical film group 12 is provided with the first lug 122. In an embodiment, a number of the first lugs 122 on each lateral side is the same. Each lateral side is provided with at least two first lugs 122 evenly distributed. Exemplarily, two first lugs 122 are arranged on each lateral side, and the first lugs 122 on two opposite lateral sides are arranged facing each other.

In other embodiments, since the first lug 122 is more prone to trip at a junction (that is, at a corner) of two adjacent lateral plates 102, in order to reduce the risk of tripping, a distribution density of the first lugs 122 disposed adjacent to both ends of each of the lateral plates 102 may be greater than a distribution density of the first lugs 122 disposed at a middle portion of each of the lateral plates 102; or, lengths of the first lugs 122 disposed adjacent to both ends of each of the lateral plates 102 may be greater than a length of the first lug 122 disposed at the middle portion of each of the lateral plates 102.

Furthermore, in a length direction of the lateral plate 102, lengths of the grooves 1021 disposed adjacent to both ends of each of the lateral plates 102 may be greater than a length of the groove 1021 disposed at the middle portion of each of the lateral plates 102.

Specifically, the optical film group 12 includes, for example, one or more of a diffusion film, a brightness enhancement film, a privacy protection film, and the like. For example, in the embodiment, the optical film group 12 includes a diffusion film, a brightness enhancement film, and a privacy protection film taped together as a whole.

Furthermore, in the embodiments of the present disclosure, there is a first gap between an outer wall 1023 of the first lug 122 and an inner wall 1022 of the groove 1021 correspondingly arranged to allow for a certain space for redundancy, so as to avoid a wavy pattern of the optical film group 12 which cannot expand freely at a high temperature. The inner wall 1022 of the groove 1021 refers to a side of the lateral plate 102 close to the chamber, and the outer wall 1023 of the first lug 122 refers to a side of the first lug 122 away from the chamber.

It should be noted that the above gap is a gap in a horizontal direction, which depends on two parameters: one is an expansion gap, which needs to prevent the first lug 122 from bumping into the inner wall 1022 of the groove 1021 when it expands at a high temperature; and the other one is a film pressure, that is, a portion of the optical film group 12 protrudes into the groove 1021 should be avoided shrinking outside the groove 1021 at a low temperature. These two parameters are related to a size of the optical film group 12 and the high and low temperature expansion and contraction coefficients. In actual application scenarios, the above parameters should be determined according to specific conditions.

Furthermore, a light shielding layer 13 is disposed on a side of the optical film group 12 away from the bottom plate 101. An orthographic projection of the light shielding layer 13 on the bottom plate 101 at least covers an orthographic projection of edges of the film body 121 on the bottom plate 101. In the related art, since the middle frame is opaque, bright lines on the edges of the optical film group 12 can be blocked, but in the embodiments of the present disclosure, since the middle frame is eliminated, the light shielding layer 13 plays the role of blocking the bright lines on the edges of the optical film group 12, which can prevent optical reflection or refraction problems due to the uneven edges of the optical film group 12, and prevent the bright lines affecting the display effect on the edges of the optical film group 12. The edges refer to outer edges of the optical film group 12, and in particular, to outer edges of the film body 121.

It should be noted that the light shielding layer 13 may only cover the edges of the film body 121. Furthermore, the light shielding layer 13 may also cover the first lugs 122 and the edges of the film body 121 at the same time. Specifically, a lateral edge of the light shielding layer 13 close to the lateral plate 102 is vertically flush with a lateral edge of the first lug 122 close to the lateral plate 102.

Furthermore, the light shielding layer 13 may also cover a side of the first lug 122 away from the bottom plate 101.

Optionally, the light shielding layer 13 includes a black ink or a black light shielding tape. The light shielding layer 13 may be directly formed on the optical film group 12, or may be attached to the optical film group 12 after formed.

In the embodiment, the edge of the film body 121 is flush with the edge of the light guide plate 11 in a top view direction. In other embodiments, the edge of the light guide plate 11 is closer to the lateral plate 102 than the edge of the film body 121 in the top view direction. In an embodiment, as illustrated in FIG. 2, the inner wall 1022 of the lateral plate 102 is recessed toward a side away from the optical film group 12 to define the groove 1021.

In the embodiments of the present disclosure, a reflective film 16 is disposed between the light guide plate 11 and the bottom plate 101. The reflective film 16 is configured to reflect the light incident on a surface of the reflective film 16 to a side of the light guide plate close to the optical film group 12, which is beneficial to improve the light extraction efficiency. At the same time, the reflective film 16 has the function of a double-sided adhesive tape to fix the light guide plate 11 on the bottom plate 101, so as to avoid shaking of the light guide plate 11 and reduce the risk of tripping and displacement.

Figure 3:
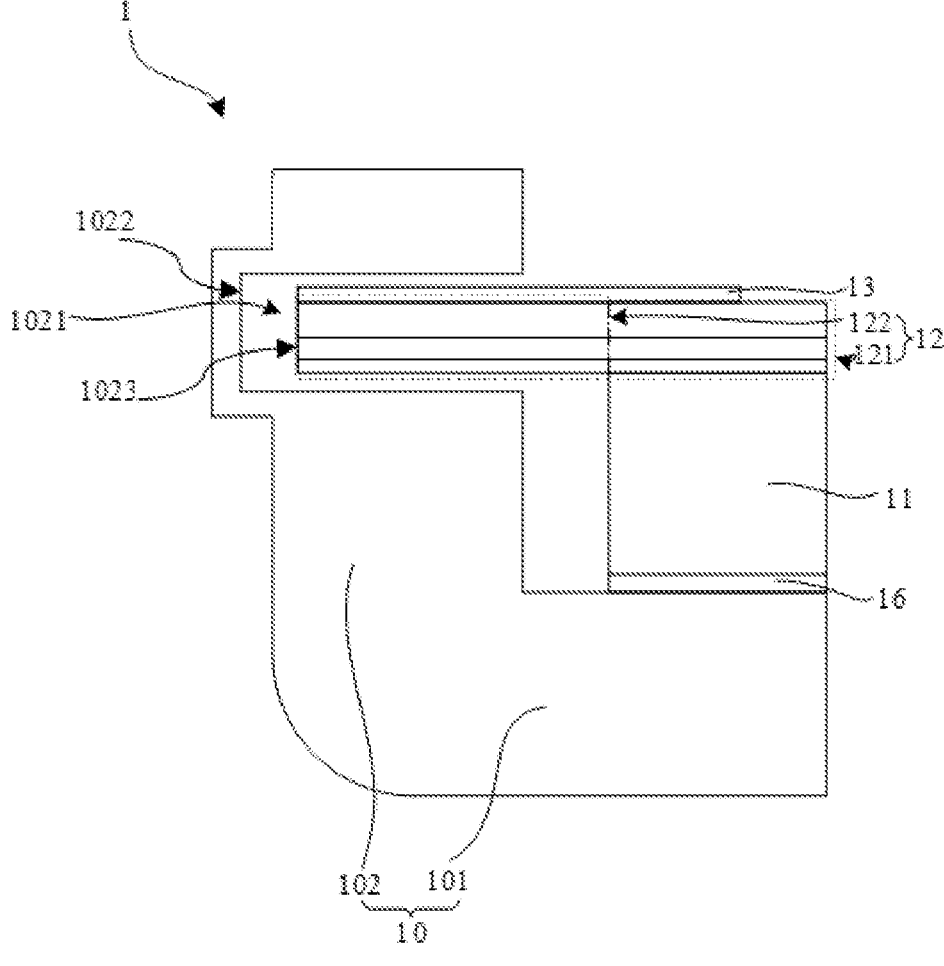
FIG. 3 is a second cross-sectional schematic view of a backlight module according to an embodiment of the present disclosure.

In another embodiment, referring to FIG. 3, FIG. 3 is a second cross-sectional schematic view of a backlight module according to an embodiment of the present disclosure. The structure illustrated in FIG. 3 differs from the structure illustrated in FIG. 2 in that the inner wall and an outer wall of the lateral plate 102 are both recessed toward the side away from the optical film group 12 to define the groove 1021. That is, the inner wall 1022 and the outer wall 1023 of the lateral plate 102 form a protrusion. Since a thickness of the lateral plate 102 in the horizontal direction is limited, compared with that only the inner wall 1022 of the lateral plate 102 is recessed toward the side away from the optical film group 12, a depth of the groove 1021 in this embodiment may be increased in the horizontal direction, which is conducive to improving the fixing effect of the first lug 122, thereby further avoiding tripping of the optical film group 12.

In the present disclosure, as illustrated in FIG. 1 and FIG. 3, there is a second gap between the light guide plate 11 and the lateral plate 102. The second gap is located on a side of the first lug 122 adjacent to the bottom plate 101 to allow for a certain space of the light guide plate 11 for redundancy, so as to avoid damage to the light guide plate 11 caused by a contact between the light guide plate 11 and the lateral plate 102.

Furthermore, a distance between a surface of the light guide plate 11 away from the bottom plate 101 and the bottom plate 101 is greater than a distance between a surface of the groove 1021 close to the bottom plate 101 and the bottom plate 101. That is, the surface of the light guide plate 11 away from the bottom plate 101 is higher than the surface of the groove 1021 close to the bottom plate 101, so that the first lug 122 above the light guide plate 11 can smoothly protrude into the groove 1021.

Figure 4:
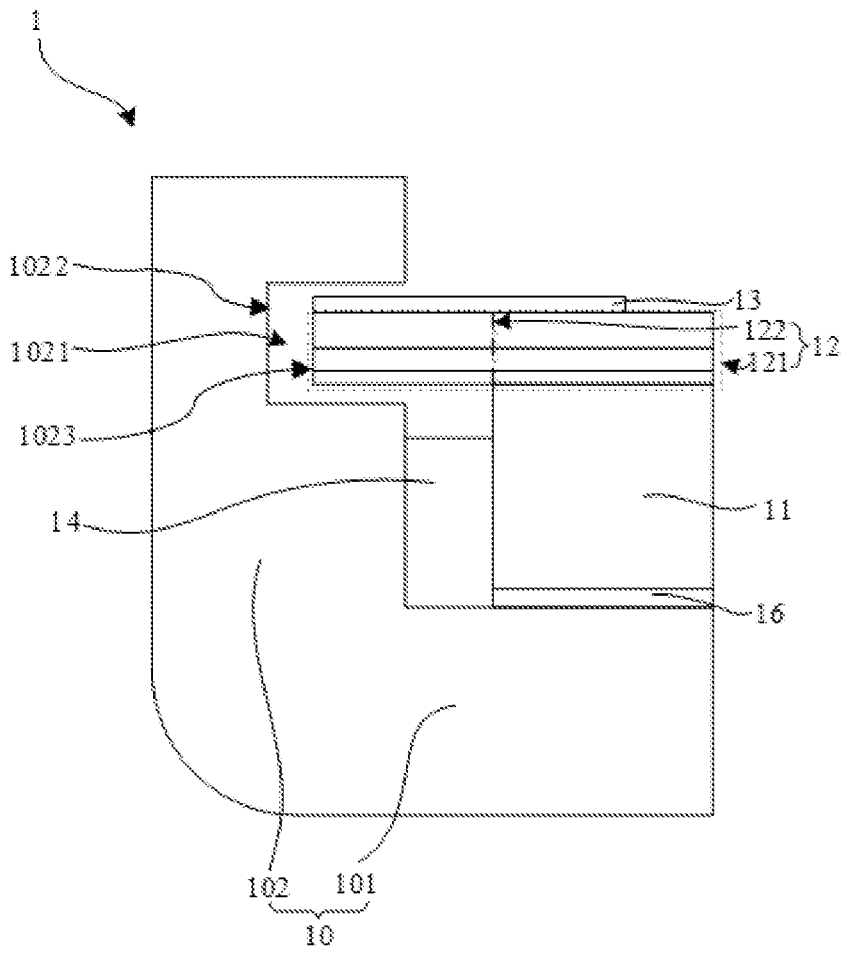
FIG. 4 is a third cross-sectional schematic view of a backlight module according to an embodiment of the present disclosure.

In an embodiment, referring to FIG. 4, FIG. 4 is a third cross-sectional schematic view of a backlight module according to an embodiment of the present disclosure. The structure illustrated in FIG. 4 differs from the structure illustrated in FIG. 1 in that the backlight module 1 further includes at least one fixing block 14 located in the second gap and abutting against the light guide plate 11 and the lateral plate 102. The fixing block 14 plays a role of connecting the backboard 10 and the light guide plate 11, so as to prevent the light guide plate 11 from shaking left and right, and at the same time prevent the light guide plate 11 from falling out of the chamber, which may affect normal light emission. In the embodiment, the fixing block 14 is fixed to the light guide plate 11 and the lateral plate 102 through interference fits, so as to realize fixing through frictional forces between the fixing block 14 and the light guide plate 11 and between the fixing block 14 and the lateral plate 102.

In the present disclosure, a side of the fixing block 14 away from the bottom plate 101 is lower than a side of the groove 1021 close to the bottom plate 101.

Optionally, a hardness of the fixing block 14 is less than a hardness of the lateral plate 102 and a hardness of the light guide plate 11. The fixing block 14 may be a flexible block, and the flexible block is a rubber block or a silicone block. While the flexible block plays the role of fixed connection, it may also play a certain buffering role, which is beneficial to prevent the light guide plate 11 from colliding with the backboard 10 when it shakes, causing the light guide plate 11 to be damaged and affecting optical performance.

Figure 5:
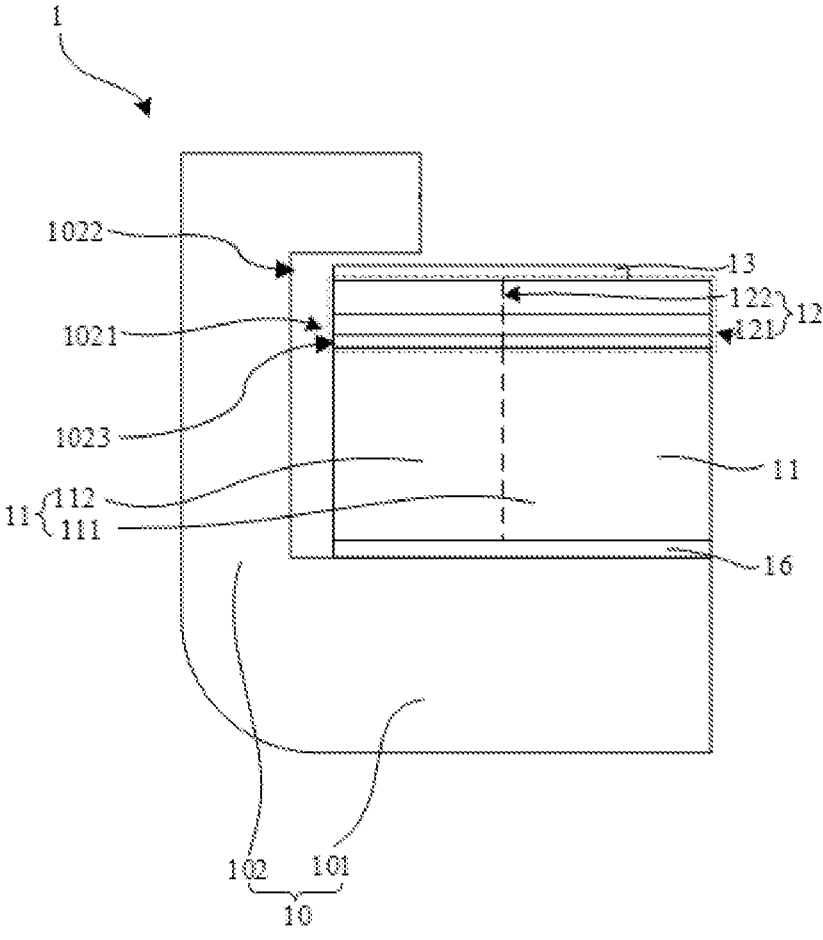
FIG. 5 is a fourth cross-sectional schematic view of a backlight module according to an embodiment of the present disclosure.

In an embodiment, referring to FIG. 5, FIG. 5 is a fourth cross-sectional schematic view of a backlight module according to an embodiment of the present disclosure. The structure illustrated in FIG. 5 differs from the structure illustrated in FIG. 2 in that the light guide plate 11 includes a light guide body 111 and at least one second lug 112 connected with the light guide body 111. The film body 121 is located on the light guide body 111. The first lugs 122 are located on the second lugs 112 and correspond to the second lugs 112 one by one. The second lug 112 correspondingly protrudes into the groove 1021.

Furthermore, the surface of the groove 1021 close to the bottom plate 101 is flush with the surface of the bottom plate 101 close to the second lug 112. That is, a lower wall of the groove 1021 is the bottom plate 101. That is, a lower end of the groove 1021 passes through the lateral plate 102 and exposes the bottom plate 101.

Figure 6:
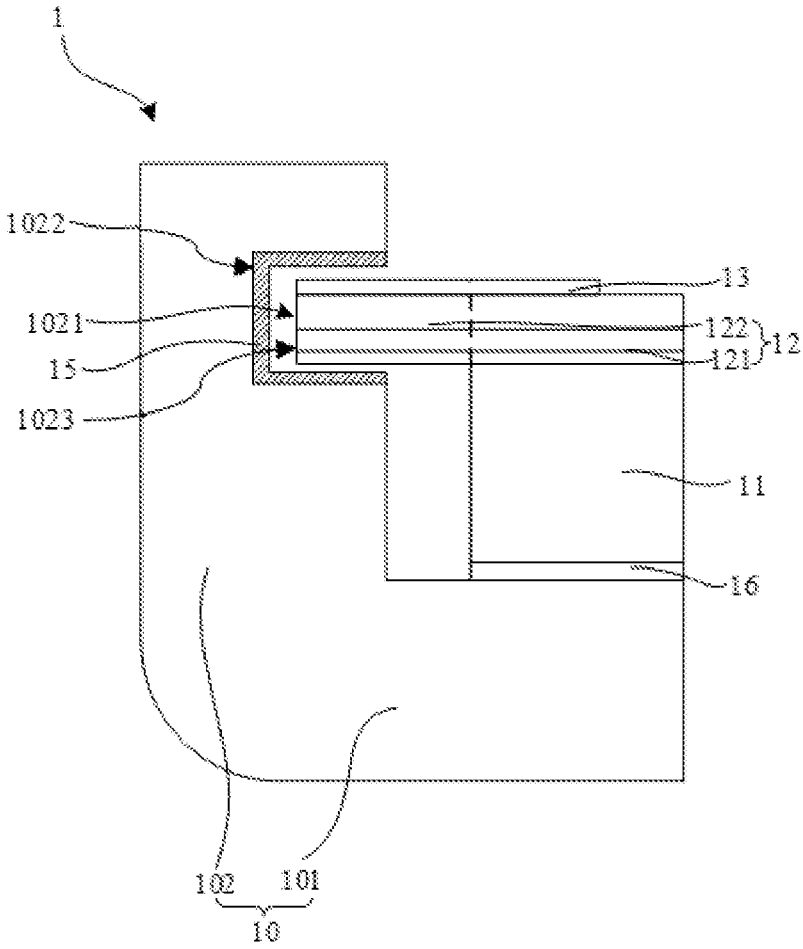
FIG. 6 is a fifth cross-sectional schematic view of a backlight module according to an embodiment of the present disclosure.

In an embodiment, referring to FIG. 6, FIG. 6 is a fifth cross-sectional schematic view of a backlight module according to an embodiment of the present disclosure. The structure illustrated in FIG. 6 differs from the structure illustrated in FIG. 2 in that a buffer layer 15 is provided between the outer wall 1023 of the first lug 122 and the inner wall 1022 of the groove 1021 correspondingly arranged, so as to prevent damage caused by collision between the first lug 122 and the groove 1021. Specifically, the buffer layer 15 may be made of an organic material, such as foam.

The backlight module 1 further includes a light source (not shown in the figures). The light source may be a backlight. The light source is arranged on a side of the lateral plate 102 adjacent to the light guide plate 11. A light emitting surface of the light source faces the light guide plate 11. Specifically, the light source may be an organic light emitting diode.

Furthermore, the backlight module 1 further includes a circuit board (not shown in the figures) electrically connected to the light source. The circuit board is configured to control the light source to be turned on and off. Optionally, the circuit board includes a soft board, such as a flexible circuit board, but is not limited thereto. For example, the circuit board may also include a hard board, such as a PCB or a ceramic board.

Figure 7:
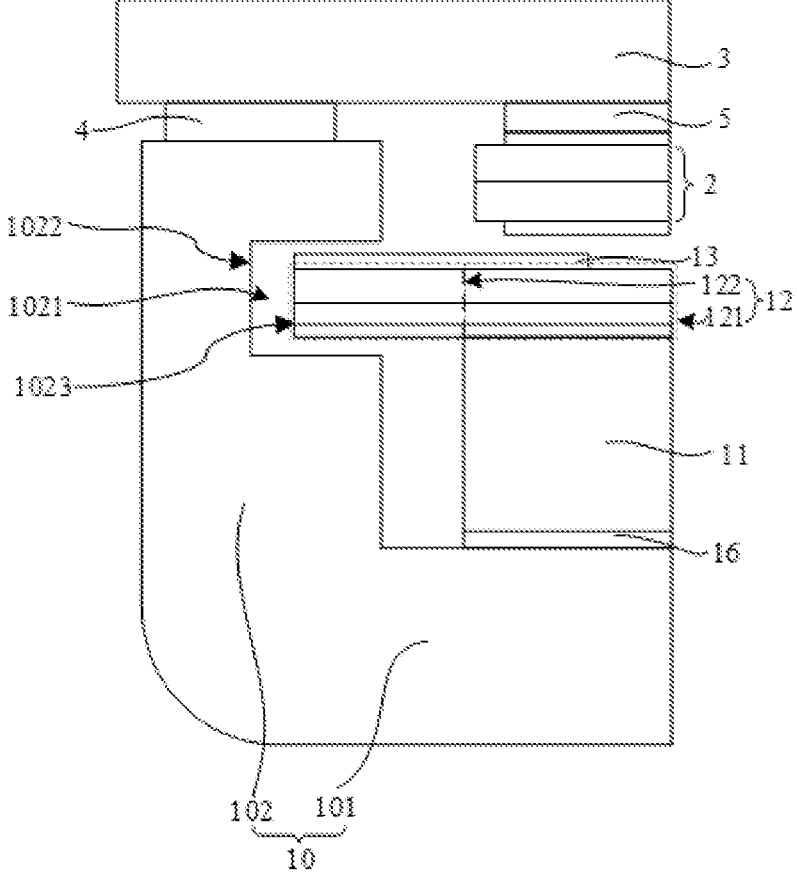
FIG. 7 is a cross-sectional schematic view of a display module according to an embodiment of the present disclosure.

Referring to FIG. 7, the embodiments of the present disclosure also provide display modules. The display module may be a vehicle display module. The display module includes the backlight module 1 in the above embodiment, a display panel 2, and a cover plate 3. The display panel 2 is located at the light emitting side of the backlight module 1. The cover plate 3 is located on a side of the display panel 2 away from the backlight module 1 and is fixedly connected with the display panel 2. The cover plate 3 is fixedly connected to an end surface of the lateral plate 102 away from the bottom plate 101.

In the embodiments of the present disclosure, the display panel 2 may be a liquid crystal display panel, and the backlight module 1 is configured to provide backlight for the liquid crystal display panel. The liquid crystal display panel may include a color filter substrate and an array substrate disposed opposite to each other, and a liquid crystal layer disposed between the color filter substrate and the array substrate. Since this is a related technology, it will not be described in detail here. In the embodiments of the present disclosure, the array substrate is closer to the optical film group 12 than the color filter substrate.

The cover plate 3 may be a glass cover plate 3. A first adhesive layer 4 may be used to connect the cover plate 3 and the lateral plate 102. The first adhesive layer 4 may be OCA optical glue or OCR glue.

It should be noted that even if the middle frame is eliminated, the OCA optical glue has a sufficient bonding strength, which can ensure stability of the connection between the cover plate 3 and the backboard 10. In addition, the display panel 2 and the cover plate 3 are connected through a second adhesive layer 5. A material of the second adhesive layer 5 may be the same as that of the first adhesive layer 4, and is the OCA optical glue, which may ensure the stability of the connection between the display panel 2 and the cover plate 3.

Specifically, the display module may be a vehicle-mounted display module. The vehicle-mounted display module includes a vehicle display screen, a vehicle-mounted central control, a vehicle-mounted instrument display, and so on.

The beneficial effects are: in the backlight modules and the display modules provided by the present disclosure, at least one groove is provided on the inner walls of the lateral plates of the backboard, lateral walls of the film body extend toward the backboard to form at least one first lug, and the first lug correspondingly protrudes into the groove. The first lug is matched with the groove to support the display panel, which replaces the middle frame configured to support the display panel in the related art, so the middle frame may be eliminated, which may reduce the deformation of the module, is beneficial to simplify the assembly process to reduce the difficulty and costs of assembly. In addition, the groove can function as a limit to prevent the optical film group from tripping due to a large displacement in the vertical direction.

In summary, although the present disclosure has disclosed the above with preferred embodiments, the above preferred embodiments are not intended to limit the present disclosure. Those of ordinary skill in the art can make various modifications without departing from the spirit and scope of the present disclosure. Therefore, the scope of protection of the present disclosure is subject to the scope defined in the claims.

The invention claimed is:

1. A backlight module, comprising:
a backboard, comprising a bottom plate and lateral plates connected with the bottom plate, wherein the lateral plates each extends along a light emitting direction of the backlight module to define a chamber together with the bottom plate, and at least one groove is provided on inner walls of the lateral plates;
a light guide plate, disposed on the bottom plate; and
an optical film group, comprising a film body and at least one first lug, wherein the film body is located in the chamber and disposed on the light guide plate, and the first lug extends from a lateral side of the film body towards the backboard and corresponds to the groove one by one; and
wherein the first lug correspondingly protrudes into the groove, the inner wall and an outer wall of at least one of the lateral plates form a protrusion corresponding to the groove, and the protrusion extends in a direction away from the first lug.

2. The backlight module according to claim 1, wherein there is a first gap between an outer wall of the first lug and an inner wall of the groove correspondingly arranged.

3. The backlight module according to claim 1, wherein a light shielding layer is disposed on a side of the optical film group away from the bottom plate, and an orthographic projection of the light shielding layer on the bottom plate at least covers an orthographic projection of edges of the film body on the bottom plate.

4. The backlight module according to claim 3, wherein the light shielding layer covers a side of the first lug away from the bottom plate.

5. The backlight module according to claim 1, wherein there is a second gap between the light guide plate and the lateral plate, and the second gap is located on a side of the first lug adjacent to the bottom plate.

6. The backlight module according to claim 5, wherein a distance between a surface of the light guide plate away from the bottom plate and the bottom plate is greater than a distance between a surface of the groove close to the bottom plate and the bottom plate.

7. The backlight module according to claim 5, further comprising at least one fixing block located in the second gap and abutting against the light guide plate and the lateral plate.

8. The backlight module according to claim 7, wherein a hardness of the fixing block is less than a hardness of the lateral plate and is less than a hardness of the light guide plate.

9. The backlight module according to claim 1, wherein the light guide plate comprises a light guide body and at least one second lug connected with the light guide body; the film body is located on the light guide body; and the first lug is located on the second lug, and the second lug correspondingly protrudes into the groove.

10. The backlight module according to claim 9, wherein a surface of the groove close to the bottom plate is flush with a surface of the bottom plate close to the second lug.

11. The backlight module according to claim 1, wherein a buffer layer is provided between an outer wall of the first lug and an inner wall of the groove correspondingly arranged.

12. The backlight module according to claim 1, wherein the inner wall and the outer wall of the at least one of lateral plates are both recessed toward a side away from the optical film group to define the groove.

13. The backlight module according to claim 1, wherein the light guide plate comprises a light guide body and at least one second lug connected with the light guide body; the film body is located on the light guide body; and the first lug is located on the second lug, and the second lug correspondingly protrudes into the groove; and wherein a side wall of the groove close to the bottom plate is coplanar with an upper surface of the bottom plate.

14. The backlight module according to claim 1, wherein there is a second gap between the light guide plate and the lateral plate, and the second gap is located on a side of the first lug adjacent to the bottom plate; the backlight module further comprises at least one fixing block located in the second gap and abutting against the light guide plate and the lateral plate; and wherein a side of the fixing block away from the bottom plate is lower than a side of the groove close to the bottom plate.

15. A display module, comprising:

a backlight module, comprising:

a backboard, comprising a bottom plate and lateral plates connected with the bottom plate, wherein the lateral plates each extends along a light emitting direction of the backlight module to define a chamber together with the bottom plate, and at least one groove is provided on inner walls of the lateral plates;

a light guide plate, disposed on the bottom plate; and an optical film group, comprising a film body and at least one first lug, wherein the film body is located in the chamber and disposed on the light guide plate, and the first lug extends from a lateral side of the film body towards the backboard and corresponds to the groove one by one;

a display panel, disposed on a light emitting side of the backlight module; and a cover plate, located on a side of the display panel away from the backlight module and fixedly connected to the display panel, wherein the first lug correspondingly protrudes into the groove, and the cover plate is fixedly connected to end surface of the lateral plates away from the bottom plate, the inner wall and an outer wall of at least one of the lateral plates form a protrusion corresponding to the groove, and the protrusion extends in a direction away from the first lug.

16. The display module according to claim 15, wherein there is a first gap between an outer wall of the first lug and an inner wall of the groove correspondingly arranged.

17. The display module according to claim 15, wherein a light shielding layer is disposed on a side of the optical film group away from the bottom plate, and an orthographic projection of the light shielding layer on the bottom plate at least covers an orthographic projection of edges of the film body on the bottom plate; and/or wherein a light shielding layer is disposed on a side of the optical film group away from the bottom plate, and the light shielding layer covers a side of the first lug away from the bottom plate.

18. The display module according to claim 15, wherein there is a second gap between the light guide plate and the lateral plate, and the second gap is located on a side of the first lug adjacent to the bottom plate; a distance between a surface of the light guide plate away from the bottom plate and the bottom plate is greater than a distance between a surface of the groove close to the bottom plate and the bottom plate.

19. The display module according to claim 15, wherein there is a second gap between the light guide plate and the lateral plate, and the second gap is located on a side of the first lug adjacent to the bottom plate; the backlight module further comprises at least one fixing block located in the second gap and abutting against the light guide plate and the lateral plate.

20. The display module according to claim 15, wherein the light guide plate comprises a light guide body and at least one second lug connected with the light guide body; the film body is located on the light guide body; and the first lug is located on the second lug, and the second lug correspondingly protrudes into the groove.

* * * * *